United States Patent
Wu et al.

(10) Patent No.: US 7,568,091 B2
(45) Date of Patent: Jul. 28, 2009

(54) COMPUTER PLATFORM SYSTEM CONTROL UNIT DATA PROGRAMMING CONTROL METHOD AND SYSTEM

(75) Inventors: Ming-Chen Wu, Taipei (TW); Margaret Chen, Taipei (TW)

(73) Assignee: Inventec Corporation, Taipei (TW)

( * ) Notice: Subject to any disclaimer, the term of this patent is extended or adjusted under 35 U.S.C. 154(b) by 521 days.

(21) Appl. No.: 11/392,188

(22) Filed: Mar. 28, 2006

(65) Prior Publication Data
US 2007/0234023 A1    Oct. 4, 2007

(51) Int. Cl.
G06F 1/24    (2006.01)
(52) U.S. Cl. ............................. 713/100; 713/1; 710/104
(58) Field of Classification Search ................ 713/1, 713/2, 100; 710/104
See application file for complete search history.

(56) References Cited

U.S. PATENT DOCUMENTS 5,754,798 A * 5/1998 Uehara et al. ............... 710/104
5,963,738 A * 10/1999 Yamaki et al. .............. 713/100
2007/0061634 A1 * 3/2007 Marisetty et al. ............ 714/48

* cited by examiner

Primary Examiner—Thuan N Du
(74) Attorney, Agent, or Firm—Muncy, Geissler, Olds & Lowe, PLLC

(57) ABSTRACT

A computer platform system control unit data programming control method and system is proposed, which is designed for use in conjunction with a computer platform, such as a network server, to provide the computer platform with a BMC (Baseboard Management Controller) data programming control function, and which is characterized by the utilization of the SMI (System Management Interrupt) of BIOS (Basic Input/Output System) for switching the BMC between normal mode and flash mode. This feature allows the proposed system, when implemented in a computer program, to be suited for use with different models of computer platforms having different hardware configurations and operating systems, which means that a single edition of the BMC data programming control program can be used on various different modes of computer platforms. This benefit allows the application to be more convenient and cost-effective to use than the prior art.

10 Claims, 2 Drawing Sheets

COMPUTER PLATFORM SYSTEM CONTROL UNIT DATA PROGRAMMING CONTROL METHOD AND SYSTEM

BACKGROUND OF THE INVENTION

1. Field of the Invention

This invention relates to information technology (IT), and more particularly, to a computer platform system control unit data programming control method and system which is designed for use in conjunction with a computer platform, such as a network server, that is equipped with a particular type of system control unit, such as a BMC (Baseboard Management Controller) module, for providing the BMC module with a data programming control function for controlling the programming of a set of BMC control code into the BMC module.

2. Description of Related Art

BMC (Baseboard Management Controller) is a server-dedicated system control unit that is specifically designed for use with a network server and capable of working independently from the server's operating system for management of the operations of various modules in the server, including the server's CPU (Central Processing Unit), hard disk drives, fan units (for heat dissipation), power supplies, networking devices, and so on. The H2168 chipset offered by the Hitachi Corporation of Japan is an example of a BMC module for network servers.

In practical implementation, the BMC system control unit relies on an embedded set of program code to provide its functionality for the server. For this sake, when new BMC program code is available from the server manufacturer, the user needs to upgrade the BMC system control unit by performing a data programming procedure to write the new BMC program code into the BMC system control unit.

One conventional BMC data programming method is to utilize the GPIO (General Purpose Input/Output) pins on the BMC chip module to switch the BMC from normal mode to flash mode. One drawback to this practice, however, is that different models of servers having different hardware configurations or operating systems typically have different GPIO configurations. Therefore, in the development of program code, it would undesirably require the design of various editions of BMC flash utility programs to offer the same data programming control functionality on various different models of servers, thus causing the application to be inconvenient and costly to implement.

SUMMARY OF THE INVENTION

It is therefore an objective of this invention to provide a computer platform system control unit data programming control method and system which is suited for use with different models of computer platforms having different hardware configurations and operating systems to provide these computer platforms with a BMC data programming control function.

The computer platform system control unit data programming control method and system according to the invention is designed for use in conjunction with a computer platform, such as a network server, that is equipped with a particular type of system control unit, such as a BMC (Baseboard Management Controller) module, for providing the BMC module with a data programming control function for controlling the programming of a set of BMC control code into the BMC module.

The computer platform system control unit data programming control method according to the invention comprises: (1) responding to a user-initiated data programming requesting event by issuing a data programming enable message; (2) responding to the data programming enable message by issuing a corresponding system management interrupt message to the startup control unit, for the purpose of activating the startup control unit to perform a system management interrupt enabled flash mode switching procedure to thereby switch the system control unit to flash mode; (3) performing a data programming procedure on the system control unit under the condition that the system control unit is switched to flash mode to thereby write a set of data into the system control unit; and after the data programming procedure is completed, issuing a programming completion message; and (4) responding to the programming completion message by issuing a corresponding system management interrupt message to the startup control unit, for the purpose of activating the startup control unit to perform a system management interrupt enabled normal mode switching procedure to thereby switch the system control unit back to normal mode.

In architecture, the computer platform system control unit data programming control system is based on an object-oriented component model which comprises: (A) a data programming request responding module, which is capable of responding to a user-initiated data programming requesting event by issuing a data programming enable message; (B) a flash mode switching module, which is capable of responding to the data programming enable message from the data programming request responding module by issuing a corresponding system management interrupt message to the startup control unit, for the purpose of activating the startup control unit to perform a system management interrupt enabled flash mode switching procedure to thereby switch the system control unit to flash mode; (C) a data programming module, which is capable of performing a data programming procedure on the system control unit under the condition that the system control unit is switched to flash mode to thereby write a set of data into the system control unit, and which is further capable of issuing a programming completion message after the data programming procedure is completed; and (D) a normal mode switching module, which is capable of responding to the programming completion message from the data programming module by issuing a corresponding system management interrupt message to the startup control unit, for the purpose of activating the startup control unit to perform a system management interrupt enabled normal mode switching procedure to thereby switch the system control unit back to normal mode.

The computer platform system control unit data programming control method and system according to the invention is characterized by the utilization of the SMI of BIOS for switching the BMC between normal mode and flash mode. This feature allows the proposed system, when implemented in a computer program, to be suited for use with different models of computer platforms having different hardware configurations and operating systems, which means that a single edition of the BMC data programming control program can be used on various different modes of computer platforms. This benefit allows the application to be more convenient and cost-effective to use than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The computer platform system control unit data programming control method and system according to the invention is disclosed in full details by way of preferred embodiments in the following with reference to the accompanying drawings.

Figure 1:
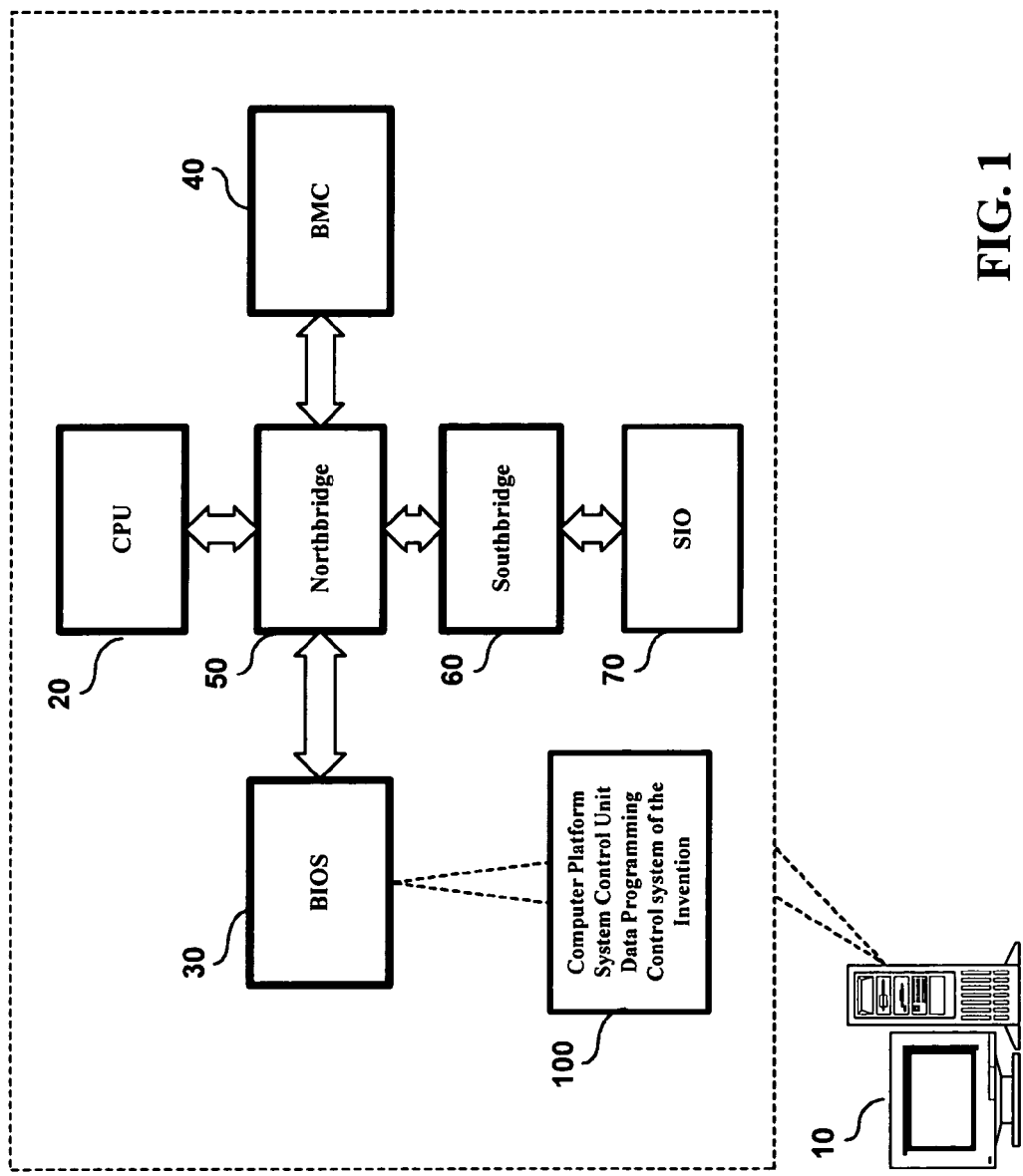
FIG. 1 is a schematic diagram showing the application of the computer platform system control unit data programming control system of the invention with a computer platform.

FIG. 1 is a schematic diagram showing the application of the computer platform system control unit data programming control system according to the invention (which is here encapsulated in a block indicated by the reference numeral 100). As shown, the computer platform system control unit data programming control system of the invention 100 is designed for use in conjunction with a computer platform 10, such as a network server or a desktop computer, that is equipped with a CPU (Central Processing Unit) 20, a startup control unit 30, and a system control unit 40; where the startup control unit 30 is for example a BIOS (Basic Input/Output System) chip module, while the system control unit 40 is for example a BMC (Baseboard Management Controller) chip module. In practical implementation, the computer platform 10 can be further equipped with a Northbridge chip module 50, a Southbridge chip module 60, and an SIO (Super Input/Output) chip module 70. The BIOS module 30 and the BMC module 40 both exchange data with the CPU 20 by way of the Northbridge chip module 50 and the Southbridge chip module 60. Since Northbridge, Southbridge, and SIO are well-known hardware components in the computer industry, detailed description thereof will not be given in this specification.

In application, the computer platform system control unit data programming control system of the invention 100 is designed to provide a data programming control function that allows the user to write a set of data, such as a set of BMC program code 202, into the BMC module 40.

Figure 2:
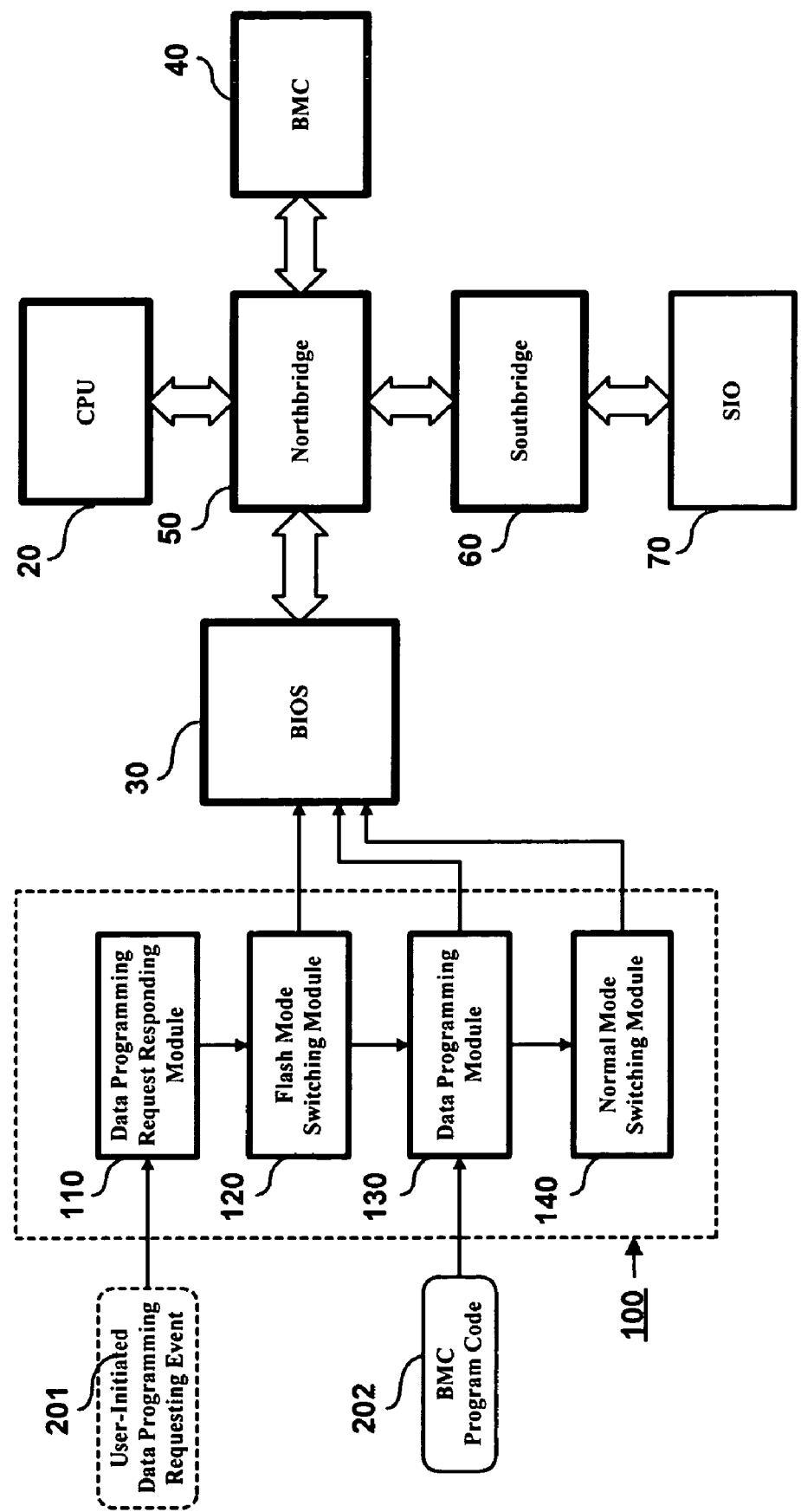
FIG. 2 is a schematic diagram showing an object-oriented component model of the computer platform system control unit data programming control system of the invention.

As shown in FIG. 2, in architecture, the computer platform system control unit data programming control system of the invention 100 is based on an object-oriented component model which comprises: (A) a data programming request responding module 110; (B) a flash mode switching module 120; (C) a data programming module 130; and (D) a normal mode switching module 140. In practical implementation, the computer platform system control unit data programming control system of the invention 100 can be fully realized by computer code and integrated as an add-on firmware module to the BIOS (Basic Input/Output System) of the computer platform 10, such that the computer code can be executed by the CPU 20 to provide the intended data programming control function for the BMC module 40.

Firstly, the respective attributes and behaviors of these constituent components 110, 120, 130, 140 of the computer platform system control unit data programming control system of the invention 100 are described in details in the following.

The data programming request responding module 110 is designed to be capable of responding to a user-initiated data programming requesting event 201 by issuing a data programming enable message to the flash mode switching module 120. The user can initiate the data programming requesting event 201 by, for example, using a graphic interface (not shown) displayed on the computer platform 10 to choose a control button, or by keying in a command to the computer platform 10.

The flash mode switching module 120 is capable of responding to the data programming enable message from the data programming request responding module 110 by issuing a corresponding SMI (System Management Interrupt) message to the BIOS module 30, for the purpose of activating the BIOS module 30 to send a flash mode enable message via the Southbridge chip module 60 to the BMC module 40. In response to the flash mode enable message, the BMC module 40 will switch its current operating mode from normal mode to flash mode.

The data programming module 130 is capable of performing a data programming procedure on the BMC module 40 under the condition that the flash mode switching module 120 is switched to flash mode to thereby write a set of data, such as a set of BMC program code 202, into the BMC module 40. After the data programming procedure is completed, the data programming module 130 is then capable of issuing a programming completion message to the normal mode switching module 140. In practical implementation, the BMC program code 202 can be fetched from a CD/DVD disc (not shown), or downloaded via Internet from a remote Web site (not shown).

The normal mode switching module 140 is capable of responding to the programming completion message from the data programming module 130 by issuing a corresponding SMI message to the startup control unit 30, for the purpose of activating the BIOS module 30 to perform an SMI-enabled normal mode switching procedure to thereby switch the BMC module 40 from flash mode back to normal mode.

The following is a detailed description of a practical application example of the computer platform system control unit data programming control system of the invention 100 during actual operation. In this application example, it is assumed that the user wants to upgrade the embedded program code of the BMC module 40 with a new set of BMC program code 202.

Referring to FIG. 1 together with FIG. 2, in actual application, whenever the user wants to program a new set of BMC program code 202 into the BMC module 40, the user can initiate a data programming requesting event 201 on the computer platform 10, for example by using a graphic interface (not shown) on the computer platform 10 to choose a graphic button, or by keying in a command to the computer platform 10. This user-initiated data programming requesting event 201 causes the data programming request responding module 110 to respond by issuing a data programming enable message to the flash mode switching module 120, thereby activating the flash mode switching module 120 to respond by issuing a corresponding SMI message to the BIOS module 30. In response to this SMI message, the BIOS module 30 is activated to send a flash mode enable message via the Southbridge chip module 60 to the BMC module 40, thereby activating the BMC module 40 to switch its current operating mode from normal mode to flash mode. After the BMC module 40 has been switched to flash mode, the data programming module 130 is activated to perform a data programming procedure on the BMC module 40 to thereby write the BMC program code 202 into the BMC module 40. After the data programming procedure is completed, the data programming module 130 is then capable of issuing a programming completion message to the normal mode switching module 140. In response to the programming completion message, the normal mode switching module 140 is activated to issue a corresponding SMI message to the BIOS module 30, whereby the BIOS module 30 is activated to perform an SMI-enabled normal mode switching procedure to thereby switch the BMC module 40 from flash mode back to normal mode. In normal mode, the BMC module 40 is then capable of executing the newly-programmed BMC program code 202 to offer an upgraded performance in the basedboard management control functionality to the computer platform 10.

In conclusion, the invention provides a computer platform system control unit data programming control method and system for use with a computer platform to provide the computer platform with a BMC data programming control function, and which is characterized by the utilization of the SMI of BIOS for switching the BMC between normal mode and flash mode. This feature allows the proposed system, when implemented in a computer program, to be suited for use with different models of computer platforms having different hardware configurations and operating systems, which means that a single edition of the BMC data programming control program can be used on various different modes of computer platforms. This benefit allows the application to be more convenient and cost-effective to use than the prior art. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer platform system control unit data programming control method for use on a computer platform that is equipped with a system control unit and a startup control unit for the purpose of providing the system control module with a data programming control function, which comprises:
    responding to a user-initiated data programming requesting event by issuing a data programming enable message;
    responding to the data programming enable message by issuing a corresponding system management interrupt message to the startup control unit, for the purpose of activating the startup control unit to perform a system management interrupt enabled flash mode switching procedure to thereby switch the system control unit to flash mode;
    performing a data programming procedure on the system control unit under the condition that the system control unit is switched to flash mode to thereby write a set of data into the system control unit; and after the data programming procedure is completed, issuing a programming completion message; and
    responding to the programming completion message by issuing a corresponding system management interrupt message to the startup control unit, for the purpose of activating the startup control unit to perform a system management interrupt enabled normal mode switching procedure to thereby switch the system control unit back to normal mode.

2. The computer platform system control unit data programming control method of claim 1, wherein the computer platform is a network server.

3. The computer platform system control unit data programming control method of claim 1, wherein the computer platform is a desktop computer.

4. The computer platform system control unit data programming control method of claim 1, wherein the system control unit is a BMC (Baseboard Management Controller) unit.

5. The computer platform system control unit data programming control method of claim 1, wherein the startup control unit is a BIOS (Basic Input/Output System) unit.

6. A computer platform system control unit data programming control system for use with a computer platform that is equipped with a system control unit and a startup control unit for the purpose of providing the system control module with a data programming control function, which comprises:
    a data programming request responding module, which responds to a user-initiated data programming requesting event by issuing a data programming enable message;
    a flash mode switching module, which responds to the data programming enable message from the data programming request responding module by issuing a corresponding system management interrupt message to the startup control unit, for the purpose of activating the startup control unit to perform a system management interrupt enabled flash mode switching procedure to thereby switch the system control unit to flash mode;
    a data programming module, which performs a data programming procedure on the system control unit under the condition that the system control unit is switched to flash mode to thereby write a set of data into the system control unit, and which issues a programming completion message after the data programming procedure is completed; and
    a normal mode switching module, which is capable of responding to the programming completion message from the data programming module by issuing a corresponding system management interrupt message to the startup control unit, for the purpose of activating the startup control unit to perform a system management interrupt enabled normal mode switching procedure to thereby switch the system control unit back to normal mode.

7. The computer platform system control unit data programming control system of claim 6, wherein the computer platform is a network server.

8. The computer platform system control unit data programming control system of claim 6, wherein the computer platform is a desktop computer.

9. The computer platform system control unit data programming control system of claim 6, wherein the system control unit is a BMC (Baseboard Management Controller) unit.

10. The computer platform system control unit data programming control system of claim 6, wherein the startup control unit is a BIOS (Basic Input/Output System) unit.

* * * * *